(12) United States Patent
Hellwig et al.

(10) Patent No.: US 6,658,381 B1
(45) Date of Patent: Dec. 2, 2003

(54) METHODS AND SYSTEMS FOR ROBUST FRAME TYPE DETECTION IN SYSTEMS EMPLOYING VARIABLE BIT RATES

(75) Inventors: Karl Hellwig, Wonfurt (DE); Robert Bäuml, Heroldsberg (DE); Jesus Andonegui, Nürnberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 330 days.

(21) Appl. No.: 09/665,297

(22) Filed: Sep. 20, 2000

Related U.S. Application Data
(60) Provisional application No. 60/159,565, filed on Oct. 15, 1999.

(51) Int. Cl.[7] .................. G10L 19/14; G10L 21/04; H04Q 1/30
(52) U.S. Cl. .............. 704/216; 704/500; 704/229; 704/201; 341/123; 341/183; 340/7.34
(58) Field of Search ................. 704/201–223, 704/500–504, 229; 370/326, 395.64, 389, 468; 33/7; 375/242, 358, 366, 240.14; 386/112

(56) References Cited

U.S. PATENT DOCUMENTS

| | | | | |
|---|---|---|---|---|
| 4,885,636 A | * | 12/1989 | Sullivan | 375/240.14 |
| 5,684,829 A | * | 11/1997 | Kizuki et al. | 375/242 |
| 5,703,877 A | * | 12/1997 | Nuber et al. | 370/395.64 |
| 5,943,376 A | * | 8/1999 | Proctor et al. | 375/358 |
| 5,949,956 A | * | 9/1999 | Fukuda | 386/112 |
| H1880 H | * | 10/2000 | Vines et al. | 33/7 |
| 6,134,287 A | * | 10/2000 | Proctor et al. | 375/366 |
| 6,201,798 B1 | * | 3/2001 | Campanella et al. | 370/326 |
| 6,353,703 B1 | * | 3/2002 | Tatsumi et al. | 704/229 |
| 6,445,702 B1 | * | 9/2002 | Wright | 370/389 |
| 6,452,941 B1 | * | 9/2002 | Bruhn | 370/468 |

FOREIGN PATENT DOCUMENTS

JP 09-274500 A * 10/1997 ............ G10L/7/04

* cited by examiner

*Primary Examiner*—Richemond Dorvil
*Assistant Examiner*—Daniel Nolan

(57) ABSTRACT

Techniques and systems for identifying coding rates of transmitted frames are described. Unused bits in rate adapted frames are used to carry frame type indicator patterns. Maximal rate frames (i.e., with a highest coding rate) need not include a frame type indicator.

15 Claims, 4 Drawing Sheets

| RATE r | 1 | 1/2 | 1/4 | 1/8 |
|---|---|---|---|---|
| Nr | 278 | 136 | 57 | 23 |
| Dr | 42 | 42 | 42 | 42 |
| Ur | 0 | 142 | 221 | 255 |
| SUM (M) | 320 | 320 | 320 | 320 |

METHODS AND SYSTEMS FOR ROBUST FRAME TYPE DETECTION IN SYSTEMS EMPLOYING VARIABLE BIT RATES

PRIORITY APPLICATION

This application claims priority from U.S. Provisional Patent Application No. 60/159,565, filed on October 15, 1999, having the same title as found above, the disclosure of which is incorporated here by reference.

BACKGROUND

The present invention generally relates to variable bit rate signals in the field of communication systems and, more particularly, to decoding variable bit rate signals which have been transmitted using one of a plurality of different coding rates.

The growth of commercial communication systems and, in particular, the explosive growth of cellular radiotelephone systems, have compelled system designers to search for ways to increase system capacity without reducing communication quality beyond consumer tolerance thresholds. One technique to achieve these objectives involved changing from systems, wherein analog modulation was used to impress data onto a carrier wave, to systems wherein digital modulation was used to impress the data on carrier waves.

In wireless digital communication systems, standardized air interfaces specify most of the system parameters, including modulation type, burst format, communication protocol, etc. For example, the European Telecommunication Standard Institute (ETSI) has specified a Global System for Mobile Communications (GSM) standard that uses time division multiple access (TDMA) to communicate control, voice and data information over radio frequency (RF) physical channels or links using a Gaussian Minimum Shift Keying (GMSK) modulation scheme at a symbol rate of 271 ksps. In the U.S., the Telecommunication Industry Association (TIA) has published a number of Interim Standards, such as IS-54 and IS-136, that define various versions of digital advanced mobile phone service (D-AMPS), a TDMA system that uses a differential quadrature phase shift keying (DQPSK) modulation scheme for communicating data over RF links.

TDMA systems subdivide the available frequency band into one or more RF channels. The RF channels are further divided into a number of physical channels corresponding to timeslots in TDMA frames. Logical channels are formed of one or several physical channels where modulation and coding is specified. In these systems, the mobile stations communicate with a plurality of scattered base stations by transmitting and receiving bursts of digital information over uplink and downlink RF channels.

The growing number of mobile stations in use today has generated the need for more voice and data channels within cellular telecommunication systems. As a result, base stations have become more closely spaced, with an increase in interference between mobile stations operating on the same frequency in neighboring or closely spaced cells. In fact, some systems now employ code division multiple access (CDMA), using a form of spread spectrum modulation wherein signals intentionally share the same time and frequency. Although digital techniques provide a greater number of useful channels from a given frequency spectrum, there still remains a need to maintain interference at acceptable levels, or more specifically to monitor and control the ratio of the carrier signal strength to interference, (i.e., carrier-to-interference (C/I) ratio).

Another factor which is increasingly important in providing various communication services is the desired/required user bit rate for data to be transmitted over a particular connection. For example, for voice and/or data services, user bit rate corresponds to voice quality and/or data throughput, with a higher user bit rate producing better voice quality and/or higher data throughput. The total user bit rate is determined by a selected combination of techniques for speech coding, channel coding, modulation, and resource allocation, e.g., for a TDMA system, this latter technique may refer to the number of assignable time slots per connection, for a CDMA system, this latter parameter may refer to the number of assignable codes per connection.

Speech coding (or more generally "source coding") techniques are used to compress the input information into a format which uses an acceptable amount of bandwidth but from which an intelligible output signal can be reproduced. Many different types of speech coding algorithms exist, e.g., residual excited linear predictive (RELP), regular-pulse excitation (RPE), etc., the details of which are not particularly relevant to this invention. More significant in this context is the fact that various speech coders have various output bit rates (referred to as coding rates herein) and that, as one would expect, speech coders having a higher output bit rate tend to provide greater consumer acceptance of their reproduced voice quality than those having a lower output bit rate. As an example, consider that more traditional, wire-based telephone systems use PCM speech coding at 64 kbps, while GSM systems employ an RPE speech coding scheme operating at 13 kbps.

In addition to speech coding, digital communication systems also employ various techniques to handle erroneously received information. Generally speaking, these techniques include those which aid a receiver to correct the erroneously received information, e.g., forward error correction (FEC) techniques, and those which enable the erroneously received information to be retransmitted to the receiver, e.g., automatic retransmission request (ARQ) techniques. FEC techniques include, for example, convolutional or block coding (collectively referred to herein as "channel coding") of the data prior to modulation. Channel coding involves representing a certain number of data bits using a certain number of code bits. Thus, for example, it is common to refer to convolutional codes by their code rates, e.g., ½ and ⅓, wherein the lower code rates provide greater error protection but lower user bit rates for a given channel bit rate.

Conventionally, each of the techniques which impacted the user bit rate were fixed for any given service provided by the radiocommunication system, or at least for the duration of a connection established by a radiocommunication system. That is, each system established connections that operated with one type of source coding, one type of channel coding, one type of modulation and one resource allocation. More recently, however, dynamic adaptation of these techniques has become a popular method for optimizing system performance in the face of the numerous parameters which may vary rapidly over time, e.g., the radio propagation characteristics of radiocommunication channels, the loading of the system, the user's bit rate requirements, etc.

It is envisioned that many different combinations of these processing techniques may be selectively employed both as between different connections supported by a radiocommunication system and during the lifetime of a single connection. However, the receiver must be aware of the types of processing being used by the transmitter in order to properly decode the information upon receipt. Generally, there are two categories of techniques for informing a receiver about processing techniques associated with a signal: (1) explicit information, i.e., a message field within the transmitted information having a mode value that is indicative of the processing type(s) and (2) implicit information, which is sometimes referred to as "blind" decoding, whereupon the receiver determines the processing performed by the transmitter by analyzing the received signal. This latter technique is employed in CDMA systems operating in accordance with the TIA/EIA IS-95 standard. Explicit information is sometimes considered to be preferable because it reduces processing delay at the receiver, but comes at the cost of the need for the transmitter to include additional overhead bits along with the user data.

Of particular interest for the present invention are frame type indicators which reflect the transmitter's currently employed source (speech) coding. As mentioned above, a frame type indicator may be transmitted to the receiver (whether it be the base or mobile station's receiver in a radiocommunications system, or any receiver in a non-radiocommunication system) so that it can employ the appropriate speech decoding techniques. Typically, this frame type indicator may include just a few bits which are conveyed along with the data fields. Thus, it will be appreciated that it is particularly important for the receiver to be able to accurately decode the frame type indicator since, otherwise, an entire frame of data may be unrecoverable. This desire for accurate reception of the mode indicator has led designers to strongly protect such indicators with heavy channel coding to improve the chances of accurately determining the correct speech decoding technique to be employed.

However, usage of heavy channel coding implies higher redundancy, which means more bits to be transmitted for the mode indicator field. This is, as explained earlier, undesirable since overhead bits should be minimized, not increased. Thus, it would be desirable to provide techniques and systems for increasing the likelihood that frame type indicators will be properly decoded, while at the same time minimizing the number of overhead bits which are transmitted with the payload data.

SUMMARY

These and other drawbacks and limitations of conventional methods and systems for communicating information are overcome according to the present invention, wherein frame type indicators are included instead of unused bits which were previously added to frames for rate adaptation. Thus, the frame type indicators can be relatively long, which provides robustness against transmission errors. Moreover, different frame type indicators may have different bit lengths.

According to exemplary embodiments of the present invention, a receiver correlates the stored frame indicator patterns of different lengths, e.g., pseudorandom number sequences or more generally any type of sequences which are at least partly orthogonal, with a received frame to identify a frame type, e.g., a coding rate. A sufficiently high correlation provides a match such that the receiver identifies the received frame as having a rate corresponding to the frame type indicator.

According to one exemplary method, the following steps are performed providing at least two different coding rates for processing information in a transmitter, wherein the frame type information is associated with said at least two different coding rates; coding, at the transmitter, information at a rate based on a selected one of the at least two different coding rates; including a frame type indicator with the coded information in a frame, the frame type indicator being selected from at least two frame type indicators depending upon the selected one of the at least two different coding rates, wherein the at least two frame type indicators have a different bit length; and transmitting the frame including the frame type indicator and the coded information.

BRIEF DESCRIPTION OF THE DRAWINGS

These and other objects, features and advantages of the present invention will become more apparent upon reading from the following detailed description, taken in conjunction with the accompanying drawings, wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The following exemplary embodiments are provided in the context of radiocommunication systems. However, those skilled in the art will appreciate that this invention is applicable to any type of communication system including wireline and wireless. Moreover, for systems and methods wherein the present invention is applied to signals transmitted over an air interface, the present invention is equally applicable, for example, to systems employing any access methodology including frequency division multiple access (FDMA), TDMA, code division multiple access (CDMA) and hybrids thereof.

Moreover, exemplary radiocommunication system operation in accordance with GSM communication systems is described in European Telecommunication Standard Institute (ETSI) documents ETS 300 573, ETS 300 574 and ETS 300 578, which are hereby incorporated by reference. Therefore, the operation of the GSM system is only described herein to the extent necessary for understanding the present invention. Although, the present invention is described in terms of exemplary embodiments in a GSM system, those skilled in the art will appreciate that the present invention could be used in a wide variety of other digital communication systems which employ variable bit rate coding schemes.

Figure 1:
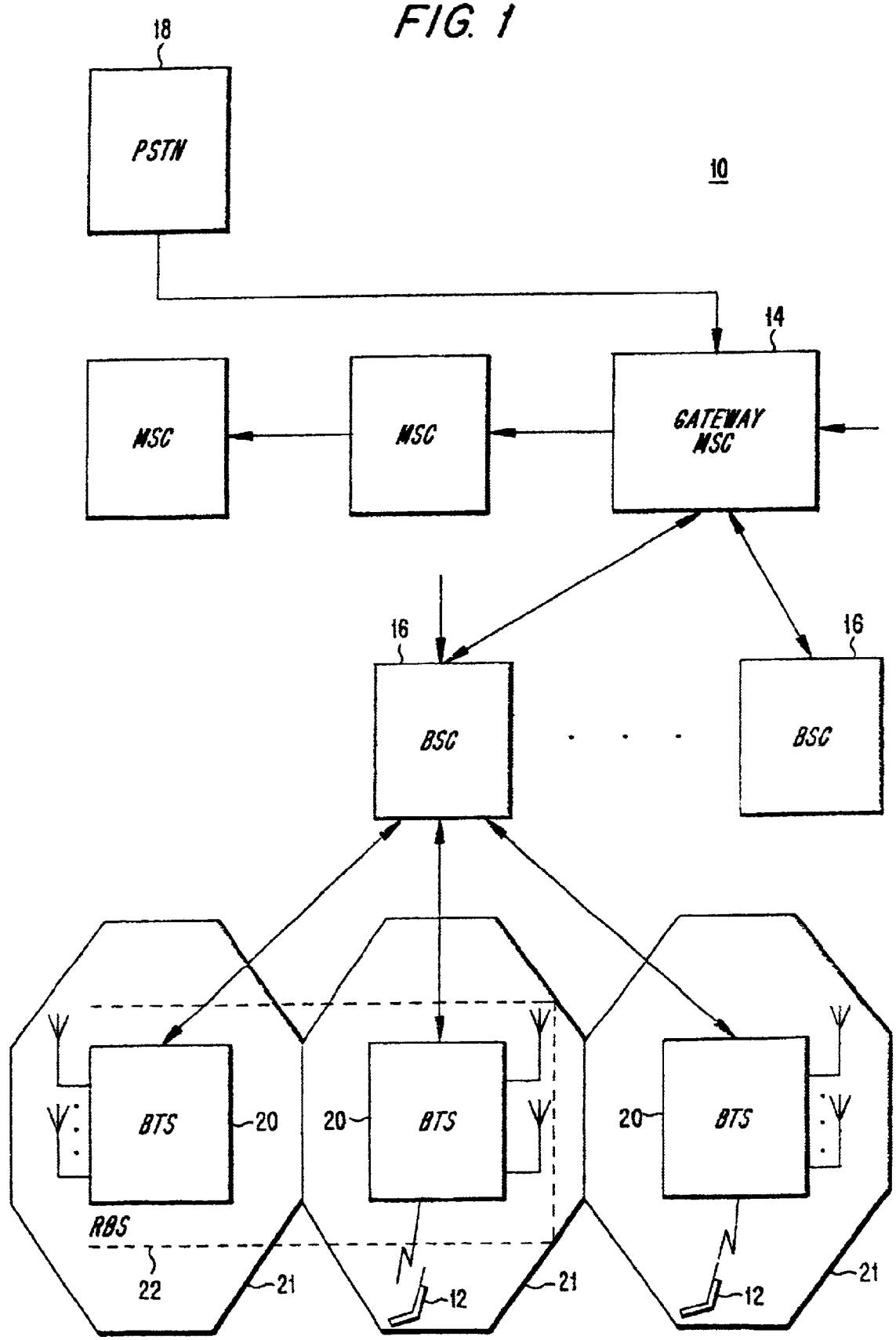
FIG. 1 is a general block diagram of a radiocommunication system within which frame type indicators according to the present invention can be implemented.

Referring to FIG. 1, a communication system 10 in which exemplary embodiments of the present invention may be implemented is depicted in order to provide some context for this invention. Therein, system 10 is designed as a hierarchical network with multiple levels for managing calls. Using a set of uplink and downlink frequencies, mobile stations 12 operating within the system 10 participate in calls using time slots allocated to them on these frequencies. At an upper hierarchical level, a group of Mobile Switching Centers (MSCs) 14 are responsible for the routing of calls from an originator to a destination. In particular, these entities are responsible for setup, control and termination of calls. One of the MSCs 14, known as the gateway MSC, handles communication with a Public Switched Telephone Network (PSTN) 18, or other public and private networks.

At a lower hierarchical level, each of the MSCs 14 are connected to a group of base station controllers (BSCs). Under the GSM standard, the BSC 16 communicates with a MSC 14 under a standard interface known as the A-interface, which is based on the Mobile Application Part of CCITT Signaling System No. 7.

At a still lower hierarchical level, each of the BSCs 16 controls a group of base transceiver stations (BTSs) 20. Each BTS 20 includes a number of tranceivers TRXs (not shown) that use the uplink and downlink RF channels to serve a particular common geographical area, such as one or more communications cells 21. The BTSs 20 primarily provide the RF links for the transmission and reception of data burst to and from the mobile stations 12 within their designated cell. In an exemplary embodiment, a number of BTSs 20 are incorporated into a radio base station (RBS) 22, The RBS 22 may be, for example, configured according to a family of RBS-2000 products, which products are offered by Telefonaktiebolaget L M Ericsson, the assignee of the present invention. For more details regarding exemplary mobile station 12 and RBS 22 implementation, the interested reader is referred to U.S. patent application Ser. No. 08/921,319, entitled "A Link Adaptation Method For Links using Modulation Schemes That Have Different Symbol Rates", to Magnus Frodigh et all, and filed on Aug. 29, 1997, the disclosure of which is expressly incorporated here by reference.

According to exemplary embodiments of the present invention, information transmitted between a BTS 20 and a mobile station 12 can be processed using different source (e.g., speech) coding modes. This information is then, typically, forwarded through various links within the fixed part of the radiocommunication system. If the other party to the connection is another mobile station 12, then the information is transmitted again over an air interface.

Figures 2, 3:
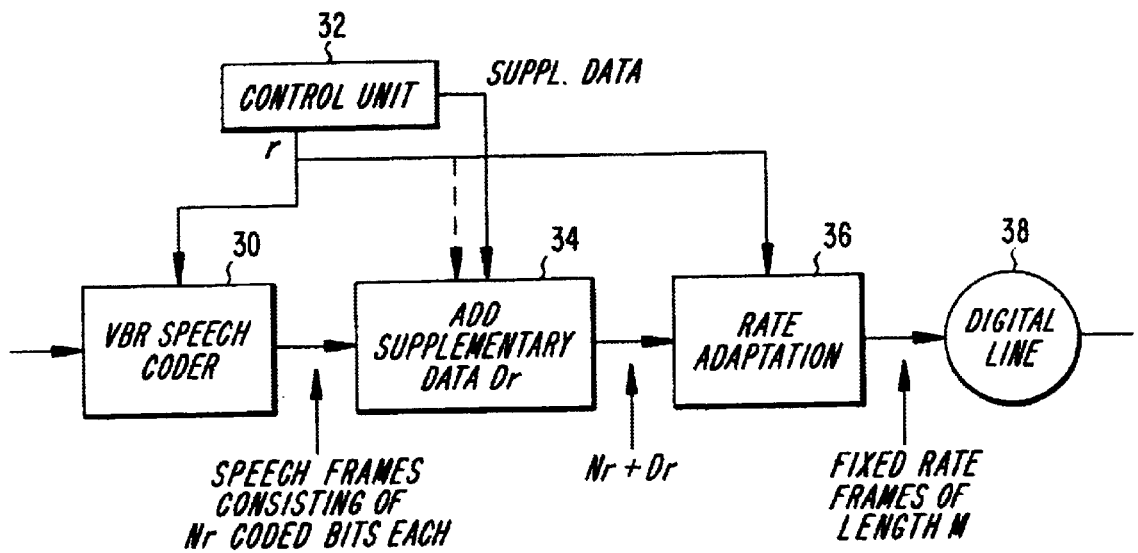
FIG. 2 is a block diagram of a variable payload bit rate transmission scheme having a fixed overall transmission rate.
FIG. 3 is a table illustrating different coding rates and bit types for which the present invention can be implemented.

To more fully understand exemplary modes for which frame type indicators can be transmitted and decoded, consider the exemplary system portion depicted in FIG. 2 wherein variable bit rate frames are mapped to a fixed rate channel. Therein, frames of variable lengths Nr, generated by a variable bit rate coder 30 (disposed, for example, in a mobile station 12), are mapped to a channel with a fixed rate, with a resulting frame length M. The coding rate r is determined by a control unit 32 and forwarded to the coder 30 which outputs speech frames consisting of Nr coded bits per frame. These coded bits are then further processed and transmitted over an air interface to a base station (not shown in this FIG.). Once received in the fixed part of the network, supplementary data, e.g., synchronization and other overhead information may be added at block 34, which may be disposed, for example, in the transcoding unit (TRAU, not shown) of a BSC or MSC. Then, rate adaptation is performed at block 36 (also disposed in the TRAU, for example) to selectively add more bits to the output of block 34 to result in fixed rate frames of length M being transmitted over digital line 38, or any type of digital channel, which may link TRAUs in different fixed nodes of the radiocommunication system.

Figure 4:
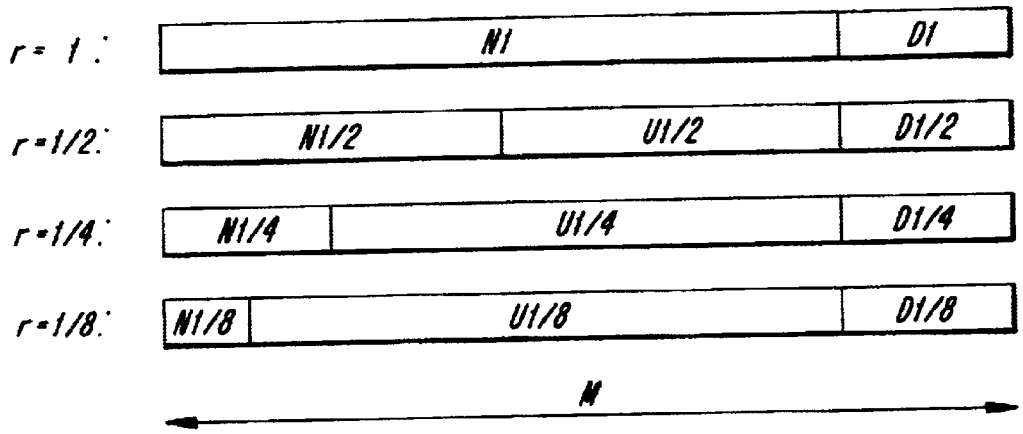
FIG. 4 is an exemplary mapping of bit types to frames for the coding rates of FIG. 3.

FIGS. 3 and 4 provide an example of a system which designates four different coding rates which may be employed for information transmission. These coding rates and frame formats have been proposed in conjunction with the so-called tandem-free operation (TFO) system development (IS-733). TFO systems are intended to reduce or eliminate multiple transcodings associated with the forwarding of data blocks across different interfaces. For example, instead of decoding speech frames received over the air interface from a mobile station, translating those decoded speech frames into pulse code modulated (PCM) speech samples for transmission over the communication links within the communication system and then recoding the speech samples once again for transmission over another air interface to an intended recipient, TFO systems are intended to transmit data blocks with only one coding/decoding step in the nodes involved in forwarding information between an originator and a recipient.

The table of FIG. 3 illustrates an exemplary relationship between payload data Nr, supplementary data Dr and unused bits Ur which provide for a fixed frame size of, in this example, 320 bits (including CRC bits). The coding rates r specified therein are relative to a maximum output bit rate. These bits can be mapped into each frame in any desired manner, an example of which is illustrated in FIG. 4 for each coding rate. Those skilled in the art will recognize that the location of particular fields, e.g., payload date, supplementary data and unused bits, can be adjusted as desired and that, in fact, these fields may be broken up within each frame. As will be appreciated by reviewing FIGS. 3 and 4, as the coding rate decreases, the number of unused, filler bits increases to maintain a fixed transmission rate.

Figure 5:
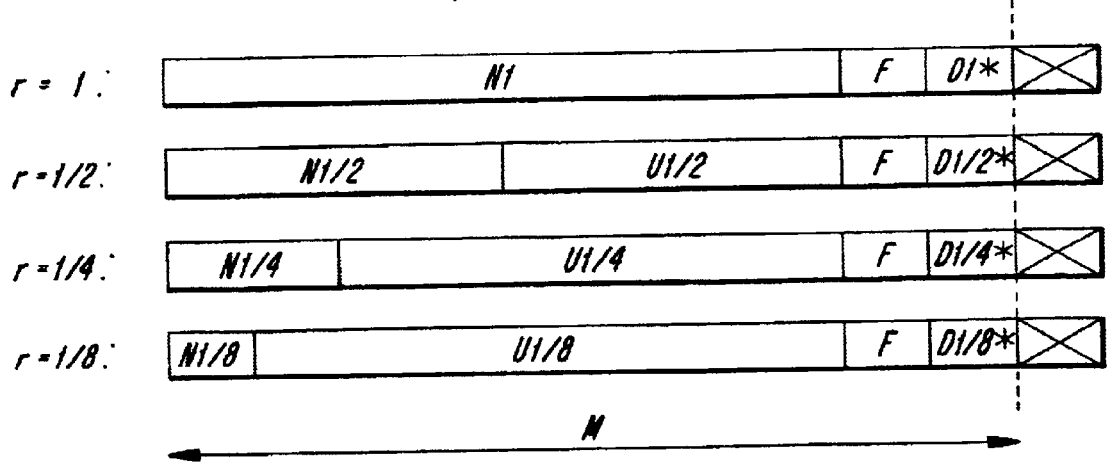
FIG. 5 depicts a conventional technique for explicitly identifying a frame type.

As mentioned above, a frame type indicator can be transmitted in each frame to inform the receiver's decoder to switch to an appropriate mode (e.g., rate 1, ½, 1/4 and ⅛ in the foregoing example) to properly decode each frame. According to one proposal, the supplementary bits Dr can be reduced by a fixed number of bits F to permit transmission of the frame type indicator in the fixed number of bits F. This concept is illustrated in FIG. 5. However, the drawback to this proposal is that it reduces the number of supplementary bits available for overhead purposes, e.g., synchronization, which in turn may result in a severe degradation in synchronization (and therefore system) performance.

Figure 6:
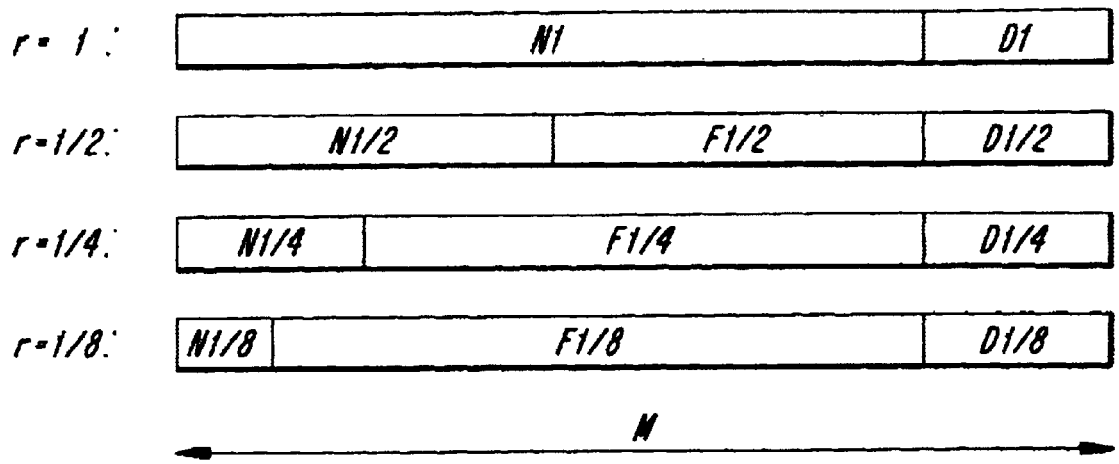
FIG. 6 depicts identifying frame type according to an exemplary embodiment of the present invention.

According to exemplary embodiments of the present invention, a frame type indicator is instead created by making use of the unused bits Ur. More specifically, as seen in FIG. 6, a different frame type pattern is inserted into each frame in this exemplary system for rates ½, 1/4 and ⅛ rate frames. Since rate 1 frames do not include any unused bits, those frames need not have an explicit frame type indicator. Each frame type indicator pattern can, therefore, have a different number of bits. For example, in this purely illustrative numerical example, a rate ½ frame type indicator can have up to 142 bits, a rate ¼ frame type indicator can have up to 221 bits and a rate ⅛ frame type indicator can have up to 255 bits. The frame type indicator patterns can, for example, be created by a pseudorandom number (PN) sequence generator in a manner which will be apparent to those skilled in the art.

A receiver can then perform a pattern matching process to determine the rate of a received frame. In this example, with four different coding rates, the receiver can attempt to identify a received frame by retrieving each of three known, frame type indicators from memory and searching the received frame to determine if a match exists. For example, the receiver can retrieve a first frame indicator pattern of, for example, 142 bits that is associated with ½ rate frames and determine a correlation level between the received frame and the first frame indicator. If the level of correlation is high enough, then the receiver will identify that frame as a rate ½ frame. Otherwise, the process will continue to retrieve a second frame indicator pattern of, for example, 221 bits and perform a second correlation. If no match is found, then the receiver will proceed to retrieve the third frame indicator pattern of, for example, 255 bits and perform a third correlation. If no match is identified, then the receiver will identify the frame as a rate 1 frame, i.e., a frame without an explicit frame type indicator.

Alternatively, the received frame can be correlated with all of the frame indicator patterns. Then, the maximum correlation value can be compared with a threshold value. If the maximum correlation value is below the threshold, then the receiver identifies the frame with a default (e.g., maximum) coding rate. Otherwise, if the maximum correlation value exceeds the threshold, then the frame is identified as having a coding rate associated with the frame indicator pattern that generated the maximum correlation value.

Of course, even if all of the unused bits are used for the frame type indicator, not all of the bits need to be involved in the correlation. For example, a subset of the stored frame type indicators can be used to perform the correlation depending upon the degree of accuracy desired relative to the processing resources to be employed in the identification task.

The frame indicator field may, of course, be received with errors. Moreover, there exists the possibility that a certain frame type indicator associated with rates=½, 1/4, 1/8 will be transmitted or detected inadvertently in a frame which was actually transmitted at coding rate 1. The probability of erroneous detection of the frame type indicator in an error free case depends on the length of the frame indicator which, as discussed above, may vary for different coding rates since the unused bits are used to convey the frame type indication. With the assumption that a pattern will be accepted as a match if it is received with up to 2 bit errors, the following formula gives the probability $P_E$ of an erroneously detected pattern, in case the bits (0, 1) are equally distributed and statistically independent:

$$P_E(r \neq 1) = \left(1 + Fr + \binom{Fr}{2}\right) / 2^{Fr}$$

This formula indicates that, for frame type indicators on the order of 142 bits or greater, the probability of incorrectly identifying a received frame's coding rate is negligible. However, if desired, the payload and supplementary data can be screened prior to transmission to determine if one of the frame type indicator patterns has randomly occurred. Upon recognizing that a frame type indicator pattern is included in the payload and/or supplementary bits, the transmitter can intentionally change one, two or more of those bits to prevent erroneous coding rate identification at the receiver.

According to another exemplary embodiment of the present invention, variable rate source decoders can begin the decoding process once a certain number $L_r$ of bits are available at their input. This number of bits depends on the coding rate r, e.g., $L_1$=90 bits (for r=1), $L_{12}$=50 bits (for r=½), $L_{14}$=45 bits (for r=¼) and $L_{18}$=20 bits. Then, if the number of bits in the frame indicator pattern is set to $F_r$=90−$L_r$, the variable bit rate source decoder can determine the coding rate, and therefore begin decoding, after 90 bits regardless of the coding rate employed for a particular frame.

Figure 7:
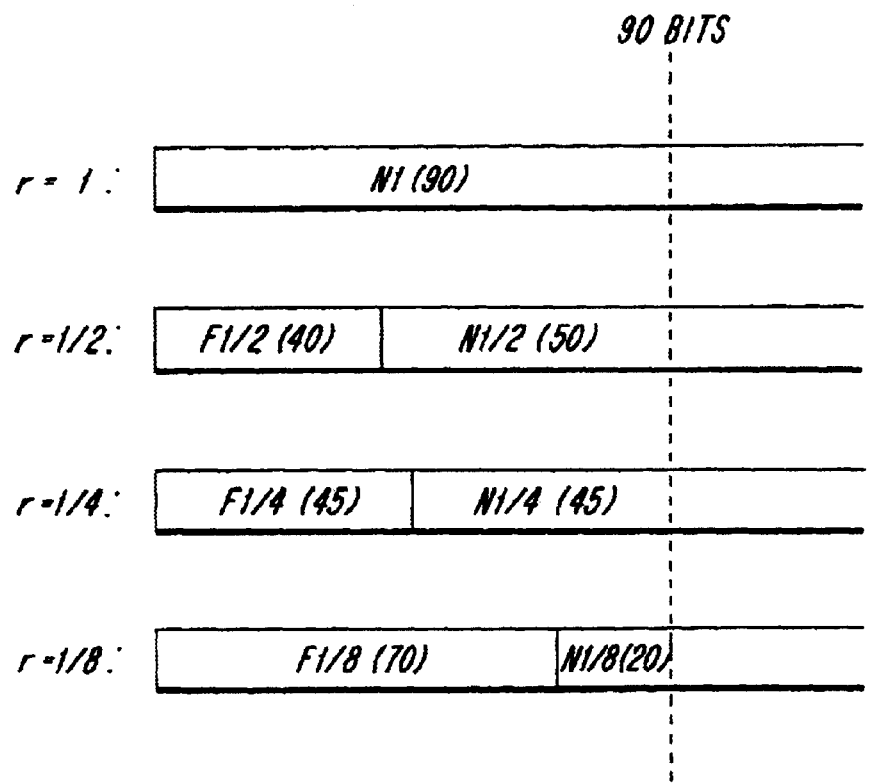
FIG. 7 illustrates frame type indicators provided according to another exemplary embodiment of the present invention.

This concept is illustrated by way of example in FIG. 7 wherein the first 90 bits of a frame are illustrated for frames coded with each of the different coding rates used in the examples of this specification. Thus, for coding rate r=1, the first 90 bits contain only payload data and no frame type indicator. For coding rate r=½, the first 90 bits include a frame type indicator of 40 bits followed by 50 bits of payload information. For coding rate=¼, the first 90 bits of the frame include a 45 bit frame type indicator followed by 45 bits of payload information. Finally, for a frame of rate=⅛, the first 70 bits comprise the frame type indicator followed by 20 bits of payload information. Of course those skilled in the art will appreciate that the numbers provided in this example are merely illustrative and that different number of bits could be provided for the frame type indicators depending upon the varying coding rates, etc.

Although the invention has been described in detail with reference only to a few exemplary embodiments, those skilled in the art will appreciate that various modifications can be made without departing from the invention. Although the frame formats described above portray the payload, supplementary data and frame indicator fields as unitary fields, any or all of these fields can be divided within the frame. For example, portions of the frame type indicator field can be interleaved with portions of the payload data within each frame. Accordingly, the invention is defined only by the following claims which are intended to embrace all equivalents thereof.

What is claimed is:

1. A method for transmitting variable bit rate information in a communication system, wherein said variable bit rate information is transmitted in frames having a fixed length comprising a variable-length payload data field and a variable-length frame type indicator field, said method comprising the steps of:

providing at least two different coding rates for processing said variable bit rate information;

coding said variable bit rate information at a rate based on a selected one of said at least two different coding rates;

including a frame type indicator with said coded information in a frame, said frame type indicator being selected from at least two frame type indicators depending upon said selected one of said at least two different coding rates, wherein said at least two frame type indicators have a different bit length inversely-proportional to said coding rate; and transmitting said frame including said frame type indicator in said variable-length frame type indicator field and said coded information in said variable-length payload data field.

2. The method of claim 1, wherein a bit length of a frame type indicator associated with a lower coding rate is greater than a bit length of a frame type indicator associated with a higher coding rate.

3. The method of claim 1, wherein said coding is speech coding.

4. The method of claim 1, wherein said at least two coding rates are rate one and rate ½.

5. The method of claim 4, wherein said frame type indicator associated with rate one has a bit length of zero and said frame type indicator associated with rate ½ has a bit length of 40.

6. A method for determining a frame type of a received frame of information comprising the steps of:

receiving said frame;

correlating said received frame with a first frame indicator pattern;

identifying said received frame as having a first type associated with said first frame indicator pattern if a result of said correlation exceeds a threshold;

correlating, if said received frame is not identified as having said first type, said received frame with a second frame indicator pattern;

identifying said received frame as having a second type associated with said second frame indicator pattern if a result of said correlation exceeds a threshold, wherein said first and second frame indicator patterns have different bit lengths; and otherwise, identifying said received frame as having a third type.

7. The method of claim 6, wherein said first, second and third types are different speech coding rates.

8. A receiver for receiving variable bit rate information, wherein said variable bit rate information is transmitted in frames having a fixed length comprising a variable-length payload data field and a variable-length frame type indicator field, comprising:

receive processing circuitry for receiving a frame of information;

a memory for storing a plurality of frame type indicator patterns, including a different frame type indicator pattern for each of a plurality of different coding rates, at least two of said different frame type indicator patterns having a different bit length inversely-proportional to their associated coding rates; and a processor for correlating said frame of information with each of said plurality of stored frame type indicator patterns until a match is found to identify a coding rate associated with said frame of information.

9. The receiver of claim 8, wherein each of said plurality of stored frame indicator patterns has a different length.

10. The receiver of claim 8, wherein a bit length of one of said at least two frame type indicators associated with a lower coding rate is greater than a bit length of another of said at least two frame type indicator associated with a higher coding rate.

11. The receiver of claim 8, wherein said coding is speech coding.

12. The receiver of claim 8, wherein said at least two coding rates are rate one and rate ½.

13. The receiver of claim 12, wherein said frame type indicator associated with rate one has a bit length of zero and said frame type indicator associated with rate ½ has a bit length of 40.

14. A method for determining the coding rate of a received frame of variable bit rate information, wherein said variable bit rate information is transmitted in frames having a fixed length comprising a variable-length payload data field and a variable-length frame type indicator field, and wherein a frame type indicator has a bit length inversely-proportional to a coding rate of said variable bit rate information, said method comprising the steps of:

receiving said frame;

correlating said received frame with a plurality of frame type indicator patterns;

comparing a maximum correlation value, generated by said correlating step, with a threshold;

identifying said variable bit rate information as having a coding rate associated with a frame indicator pattern that generated said maximum correlation value if said maximum correlation value exceeds said threshold; and otherwise identifying said received frame as having a default coding rate.

15. The method of claim 14, wherein said first and default types are different speech coding rates.

* * * * *